United States Patent
Walker

(10) Patent No.: US 10,762,231 B2
(45) Date of Patent: Sep. 1, 2020

(54) PROTECTING SCREENSHOTS OF APPLICATIONS EXECUTING IN A PROTECTED WORKSPACE CONTAINER PROVIDED IN A MOBILE DEVICE

(71) Applicant: Citrix Systems, Inc., Fort Lauderdale, FL (US)

(72) Inventor: James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 151 days.

(21) Appl. No.: 16/174,548

(22) Filed: Oct. 30, 2018

(65) Prior Publication Data

US 2020/0134222 A1    Apr. 30, 2020

(51) Int. Cl.
*G06F 21/62* (2013.01)
*G06F 21/60* (2013.01)
*G06F 9/451* (2018.01)

(52) U.S. Cl.
CPC ........ *G06F 21/6227* (2013.01); *G06F 21/602* (2013.01); *G06F 21/629* (2013.01); *G06F 9/451* (2018.02)

(58) Field of Classification Search
CPC .. G06F 21/602; G06F 21/629; G06F 21/6227; G06F 9/451
See application file for complete search history.

(56) References Cited

U.S. PATENT DOCUMENTS

| | | | |
|---|---|---|---|
| 9,740,860 B2 | 8/2017 | Song | |
| 9,928,631 B2 | 3/2018 | Zhu et al. | |
| 9,934,129 B1* | 4/2018 | Budurean | G06F 11/3688 |
| 10,028,021 B2 | 7/2018 | Shang et al. | |
| 10,068,071 B2 | 9/2018 | Shaw et al. | |
| 10,078,434 B2 | 9/2018 | Wu | |
| 2009/0222880 A1* | 9/2009 | Mayer | G06F 21/6218 726/1 |
| 2014/0033324 A1* | 1/2014 | Kiang | H04L 67/2861 726/27 |
| 2015/0007346 A1* | 1/2015 | Delia | G06F 21/6209 726/28 |
| 2016/0125193 A1* | 5/2016 | Dai Zovi | G06F 21/36 726/28 |
| 2017/0068829 A1* | 3/2017 | Shaw | H04N 1/32144 |
| 2017/0374037 A1* | 12/2017 | Klum | H04L 63/04 |
| 2019/0340353 A1* | 11/2019 | Mitelman | G06F 21/552 |
| 2020/0081615 A1* | 3/2020 | Lu | G06F 21/31 |

* cited by examiner

*Primary Examiner* — Sher A Khan
(74) *Attorney, Agent, or Firm* — BainwoodHuang

(57) ABSTRACT

In response to determining that a graphical user interface displayed on the display device of a mobile device at the time a screenshot capture request is received is being generated at least in part by an enterprise application executing within a protected workspace container in the mobile device, a secure screenshot save operation is performed. The secure screenshot save operation includes i) storing, within the mobile device, a screenshot image of the graphical user interface displayed on the display device of the mobile device at the time the screenshot capture request is received, and ii) preventing the screenshot image from being accessed by any personal application executing on the mobile device outside of the protected workspace container.

19 Claims, 5 Drawing Sheets

PROTECTING SCREENSHOTS OF APPLICATIONS EXECUTING IN A PROTECTED WORKSPACE CONTAINER PROVIDED IN A MOBILE DEVICE

TECHNICAL FIELD

The present disclosure relates generally to securely storing screenshots in a mobile device, and more specifically to technology for protecting screenshots of applications that are executing in a protected workspace container that is provided in a mobile device.

BACKGROUND

As the use of mobile devices to perform a wide variety of tasks has increased, users have often found it convenient or necessary to use the same mobile device to perform both personal and work tasks. Along these lines, the policy of "bring your own device" ("BYOD") allows an employee to bring their own personal mobile device (e.g. smartphone, laptop, tablet, smart watch, etc.) to the workplace, and to use it both to access proprietary resources of their employer's enterprise (e.g. applications, databases, etc.), and to also perform personal tasks.

To address security needs of the enterprise under such circumstances, Enterprise Mobility Management (EMM) technologies have been developed that allow an enterprise to specifically control the deployment and operation of enterprise applications that execute on an employee's mobile device, typically based on a set of management policies that may be provided to the mobile device from a remote enterprise server. In mobile devices running the Android™ operating system developed by Google LLC, Android Enterprise provides secure support for EMM through software containerization. As it is generally known, software containerization is a lightweight alternative to full machine virtualization, involving the encapsulation of one or more applications in a container together with their own operating environment. An application executing within a container can only see and use the specific resources that are allocated to that container, such as a subset of the mobile device memory and/or storage that is allocated to the container. In Android Enterprise, a protected workspace container is used to securely execute one or more enterprise applications and store enterprise data in isolation from the user's personal applications and data. The user's personal applications and data are located outside of the workspace container. The workspace container in Android Enterprise is a secure partition associated with a "work profile" user profile for the device, while the user's personal space container is another partition associated with a "personal profile" user profile. In this way, the Android operating system may prevent enterprise applications and/or proprietary data located in the workspace container from being accessed by the user's personal applications.

SUMMARY

Previous EMM technology in mobile devices has had shortcomings with regard to the management of screenshots that are taken of enterprise applications executing in a protected workspace container. As it is generally known, a screenshot taken on a mobile device is a digital image of the user interface that is currently visible on the display of the mobile device at the time the screenshot is captured. A screenshot may be created by built-in functionality within the operating system, and/or other software running on the device. On some mobile devices, a screenshot may be triggered by simultaneously pressing a specific combination of buttons on the mobile device.

In some previous EMM technology, the operating system of the mobile device (e.g. the Android operating system) offered the enterprise system administrator the options of either i) disabling screenshots completely for all applications executing in the protected workspace container of the mobile device, or ii) enabling screenshots for all applications executing in the protected workspace container, with the resulting screenshots then being stored in an unprotected folder that is located outside of the workspace container. In such previous systems, the only way to enable screenshots of enterprise applications executing in the workspace container was to allow the resulting screenshot images to be stored in an unsecure manner, outside of the workspace container, such that the screenshots were accessible to personal applications not executing within the workspace container. This lack of security for screenshot images taken of enterprise application user interfaces discouraged administrators from enabling screenshot capture for enterprise applications. As a result, screenshots were often completely disabled for all enterprise applications executing in the secure workspace container, in order to prevent the potential leaking of proprietary information. However, the inability to take screenshots of enterprise applications prevented the sharing of screenshots even with other employees of the enterprise, as may be useful when debugging enterprise applications. For example, it may be desirable to take a screenshot of an enterprise application user interface at the time that the enterprise application fails (e.g. due to a bug in the application), and then send the screenshot to an administrator or engineer within the enterprise to show exactly how the application is failing, so that the application can be efficiently debugged.

To address the above described and other shortcomings of previous technical solutions, new technology is described herein for protecting screenshots of applications executing in a protected workspace container provided in a mobile device. In the disclosed technology, at least one enterprise application executes within a protected workspace container in the mobile device. The protected workspace container is a software container that may, for example, be provided by the operating system of the mobile device. The protected workspace software container isolates one or more enterprise applications and their data from at least one personal application that executes on the mobile device outside of the protected workspace container, e.g. in a personal software container that may also be provided by the operating system of the mobile device. In response to receipt of a screenshot capture request, the screenshot capture request is processed by first determining whether a graphical user interface being displayed on a display device of the mobile device at the time the screenshot capture request is received is being generated at least in part by an enterprise application executing in the protected workspace container (i.e. includes or consists of a user interface generated by one of the enterprise applications executing in the protected workspace container). In response to determining that the user interface displayed on the display device of the mobile device at the time the screenshot capture request is received is being generated by an enterprise application executing within the protected workspace container in the mobile device, a secure screenshot save operation is performed, e.g. by the operating system of the mobile device. The secure screenshot save operation includes i) storing, within the mobile device, a screenshot image of the graphical user interface being displayed on the display device of the mobile device at the time the screenshot capture request is received, and ii) preventing the screenshot image from being accessed by any personal application executing on the mobile device outside of the protected workspace container.

In some embodiments, the disclosed technology prevents the stored screenshot image from being accessed by any personal application executing on the mobile device outside of the protected workspace container at least in part by selecting, prior to storing the screenshot image, a location in the data storage resources of the mobile device in which the screenshot image is to be stored that is within the protected workspace container. The screenshot image of the graphical user interface displayed on the display device of the mobile device at the time the screenshot capture request is received is then stored to the selected location in the data storage resources of the mobile device within the protected workspace container.

In some embodiments, the disclosed technology prevents the stored screenshot image from being accessed by any personal application executing on the mobile device outside of the protected workspace container at least in part by encrypting the screenshot image using an encryption key having a corresponding decryption key that is only accessible to applications executing within the protected workspace container.

In some embodiments, the disclosed technology performs the secure screenshot save operation at least in part by storing the encrypted screenshot image in a location in the data storage resources of the mobile device that is outside the protected workspace container.

In some embodiments, the disclosed technology allows the decryption key corresponding to the encryption key used to encrypt the screenshot image to be accessed only by the enterprise application executing within the protected workspace container in the mobile device that generated at least a portion of the graphical user interface being displayed on a display device of the mobile device at the time the screenshot capture request is received.

In some embodiments, multiple enterprise applications execute within the protected workspace container, and the disclosed technology allows the decryption key corresponding to the encryption key used to encrypt the screenshot image to be accessed by all of the enterprise applications executing in the protected workspace container in the mobile device.

In some embodiments, multiple enterprise applications execute within the protected workspace container, and the disclosed technology allows the decryption key corresponding to the encryption key used to encrypt the screenshot image to be accessed only by a security group of enterprise applications executing in the protected workspace container in the mobile device that includes some but not all of the enterprise applications executing in the protected workspace container.

In some embodiments, the security group of enterprise applications executing in the protected workspace container in the mobile device that is allowed to access the decryption key includes the enterprise application executing within the protected workspace container in the mobile device that generated at least a portion of the graphical user interface being displayed on the display device of the mobile device at the time the screenshot capture request was received.

In some embodiments, in response to determining that the graphical user interface being displayed on the display device of the mobile device at the time the screenshot capture request is received is not generated by any enterprise application executing within the protected workspace container in the mobile device, the disclosed technology performs a personal screenshot save operation that includes i) storing, within the mobile device, a screenshot image of the user interface displayed on the display device of the mobile device at the time the screenshot capture request is received, and ii) permitting the screenshot image to be accessed by the personal application executing on the mobile device outside of the protected workspace container.

In some embodiments, receiving the screenshot capture request may include or consist of detecting that multiple buttons on the mobile device are being pressed simultaneously.

In some embodiments, the screenshot capture request is received and processed by an operating system of the mobile device.

Embodiments of the technology described herein may provide significant improvements over previous solutions. For example, embodiments of the disclosed technology may be provided that allow a screenshot image to be captured of an enterprise application executing within a protected workspace container and then securely stored on the mobile device without exposing the stored screenshot image to access by any personal application executing on the mobile device outside of the protected workspace container. As a result, system administrators responsible for setting EMM policies for the mobile device are able to enable the capture of screenshots that include user interfaces of enterprise applications, so that such screenshots can be shared with other enterprise users, e.g. using secure enterprise communication applications such as secure electronic mail, secure instant messaging, etc. The ability to securely store and then share screenshots that include user interfaces of enterprise applications is a desirable improvement over previous technologies, e.g. during enterprise application debugging and/or other scenarios during which it is desirable that screenshot images of user interfaces from enterprise applications be securely stored and shared.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different figures. The elements of the drawings are not necessarily drawn to scale, emphasis instead being placed upon illustrating the principles of the various embodiments.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. Support for all such combinations, permutations and/or variations is considered to exist in this document.

As described herein, at least one enterprise application executes within a protected workspace container in the mobile device. The protected workspace container is a software container that may be provided by the operating system of the mobile device, and that defines the resources of the mobile device that are accessible to the enterprise applications that execute within the workspace container. The protected workspace software container isolates one or more enterprise applications executing in the mobile device and their associated data from at least one personal application that also executes on the mobile device, albeit outside of the protected workspace container, e.g. in a personal software container that may also be provided by the operating system of the mobile device. When a screenshot capture request is received, in response to receipt of the screenshot capture request, the screenshot capture request is processed by first determining whether a graphical user interface being displayed on a display device of the mobile device at the time the screenshot capture request is received is being generated at least in part by an enterprise application executing in the protected workspace container. In response to determining that the graphical user interface displayed on the display device of the mobile device at the time the screenshot capture request is received is being generated at least in part by an enterprise application executing within the protected workspace container in the mobile device, a secure screenshot save operation is performed, e.g. by the operating system of the mobile device. The secure screenshot save operation stores a screenshot image of the graphical user interface being displayed on the display device of the mobile device at the time the screenshot capture request is received and prevents that screenshot image from being accessed by any personal application executing on the mobile device outside of the protected workspace container.

Figure 1:
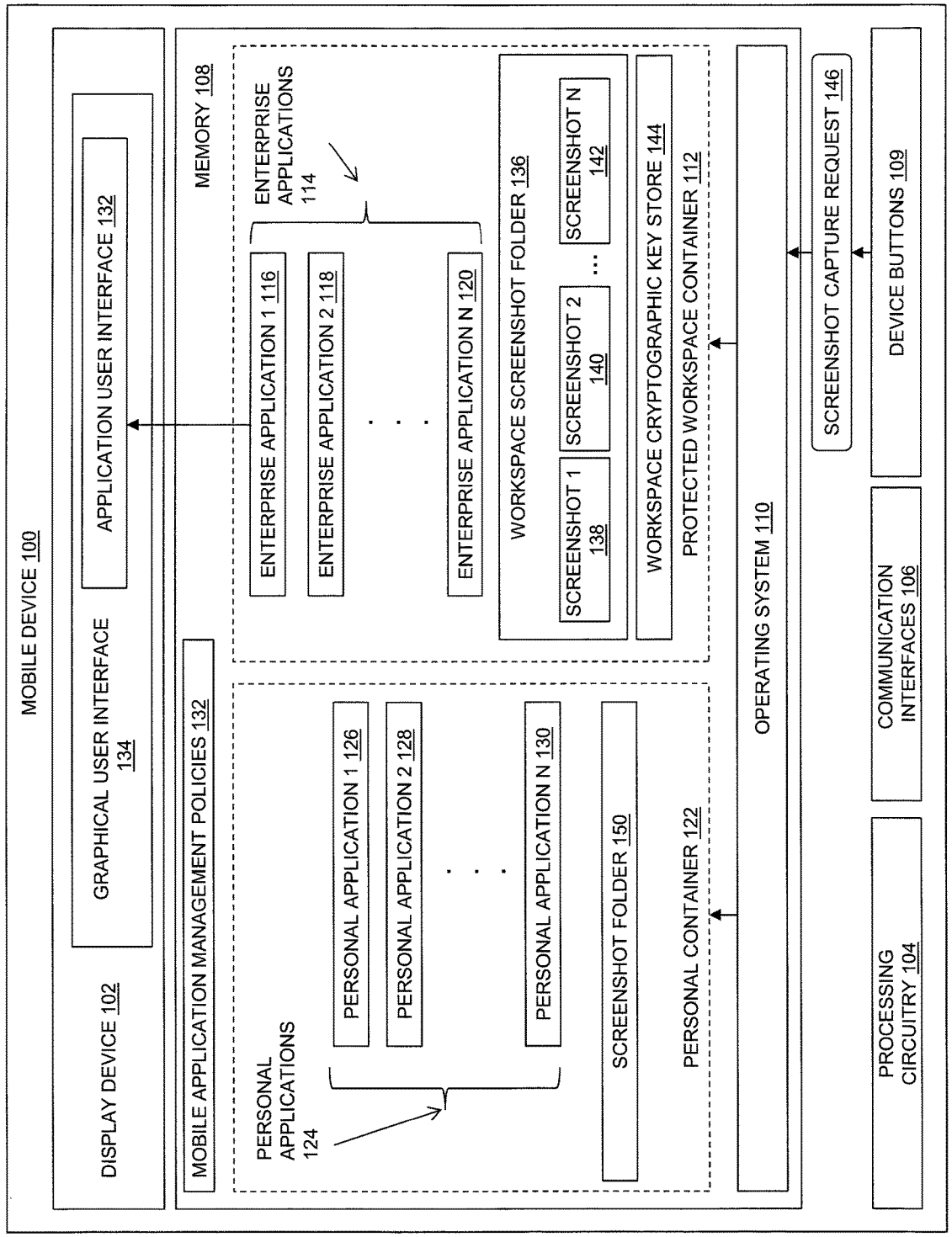
FIG. 1 is a block diagram showing a first example of components in some embodiments of the disclosed technology.

FIG. 1 is a block diagram showing a first example of components in some embodiments of the disclosed technology. As shown in FIG. 1, a Mobile Device 100 includes a Display Device 102, Processing Circuitry 104, Communication Interfaces 106, Memory 108, and Device Buttons 109. Mobile Device 100 may, for example, be a smart phone, tablet computer, e-book reader, or some other type of mobile computing device.

Display Device 102 may include or consist of an electronic visual display. A touch screen input device may be layered on top of the Display Device 102. A Graphical User Interface 134 for Mobile Device 100 that includes or consists of one or more user interfaces generated by one or more corresponding applications executing in the Mobile Device 100 may be displayed by Display Device 102.

Processing Circuitry 104 may include or consist of one or more Central Processing Units (CPUs) and associated hardware circuitry operable to execute program code stored in Memory 108.

Communication Interfaces 106 may include or consist of one more antennas and transmitter and receiver circuitry, and is operable to transmit and receive data over one or more wireless communication networks, including but not limited to one or more cellular networks, and other types of wireless communication networks, such as wireless Local Area Networks (LANs) or the like.

Memory 108 may include or consist of some combination of Random Access Memory (RAM) and Read Only Memory (ROM). Memory 108 may further include non-volatile solid state flash memory, which may be used to persistently store some or all of the Operating System 110, and/or program code of applications that are executable on the Processing Circuitry 104, and/or data generated and/or accessed by such program code.

Device Buttons 109 may include or consist of various buttons of the Mobile Device 100. Device Buttons 109 may include a set of one or more buttons that when pressed simultaneously, trigger Screenshot Capture Request 146 to be passed to Operating System 110. Each of the Device Buttons 109 may be a mechanical button, having mechanical parts that physically move when the button is pressed, and/or may be a capacitive button that reacts to the users touch. In some embodiments (e.g. mobile devices executing the Google Android operating system), the Device Buttons 109 may include buttons referred to as the Power button, Home button, Back button, Menu button, and Search button. In other embodiments (e.g. mobile devices executing the Apple iOS operating system), the Device Buttons 109 may include buttons referred to as the Home button, Ring/Silent button, Volume Up/Volume Down button(s), and Top or Side button.

Those skilled in the art will recognize that Mobile Device 100 may further include other hardware components or devices and associated circuitry, such as a camera, microphone, speaker, etc.

Memory 108 stores program code components (e.g. instructions) that execute on Processing Circuitry 102. Such executable program code is shown for purposes of illustration by Operating System 110, Enterprise Applications 114, and Personal Applications 124. Enterprise Applications 114 include one or more mobile applications that are used by the user of Mobile Device 100 to perform work tasks for a business enterprise, e.g. for a business enterprise that is an employer of the user of Mobile Device 100. The Enterprise Applications 114 may be managed by and under the control of that business enterprise. Enterprise Applications 114 are shown including Enterprise Application 1 116, Enterprise Application 2 118, through Enterprise Application N 120. Enterprise Applications 114 may include any specific type of mobile application, including but not limited to a secure electronic mail application that is operable to securely send and receive electronic mail messages, e.g. by encrypting the electronic mail messages to be sent prior to sending, using secure communication channels belonging to the enterprise to convey the electronic mail messages, and/or by limiting the destinations to which electronic mail messages can be sent to secure accounts that are controlled by the enterprise. The electronic mail messages sent by such a secure electronic mail application executing in the Protected Workspace Container 112 may be used to securely send screenshot images that are securely stored by the disclosed technology, e.g. in Workspace Screenshot Folder 136 as further described below. The Enterprise Applications 114 may also include a secure instant messaging application that securely sends and receives instant messages, e.g. by encrypting the instant messages to be sent prior to sending, using secure communication channels belonging to the enterprise to convey the instant messages, and/or by limiting the destinations to which instant messages can be sent to secure accounts that are controlled by the enterprise. The instant messages sent by such a secure instant messaging application executing in the Protected Workspace Container 112 may also be used to securely send screenshot images that are securely stored by the disclosed technology, e.g. in Workspace Screenshot Folder 136 as further described below. The Enterprise Applications 114 may further include various other specific types of mobile enterprise applications that access and display proprietary enterprise data within their user interfaces, including proprietary enterprise data that may be stored on Mobile Device 100, and/or proprietary enterprise data that may be stored in a remote enterprise database that is located on one or more server computer systems that are within and/or under the control of and managed by the enterprise.

Personal Applications 124 include or consist of one or more applications that are used by the user of Mobile Device 100 to perform personal tasks. For purposes of illustration, Personal Applications 124 are shown including Personal Application 1 126, Personal Application 2 128, through Personal Application N 130. Personal Applications 124 may include any specific type of application, including but not limited to an electronic mail application that enables the user of Mobile Device 100 to send and receive personal electronic mail messages using Mobile Device 100, an instant messaging application that enables the user of Mobile Device 100 to send and receive personal instant messages using Mobile Device 100, and/or various other specific types of mobile applications that enable the user of Mobile Device 100 to perform personal tasks, such as social networking, etc.

Enterprise Applications 114 are securely executed by Operating System 112 within the Protected Workspace Container 112. Protected Workspace Container 112 isolates Enterprise Applications 114 and any data stored within Protected Workspace Container 112 from any application that executes outside of Protected Workspace Container 112. Accordingly, Protected Workspace Container 112 protects Enterprise Applications 114, and any data stored in Protected Workspace Container 112 (e.g. the contents of Workspace Screenshot Folder 136 and Workspace Cryptographic Key Store 144), from any access by Personal Applications 124. Protected Workspace Container 112 is a software container that may be provided by Operating System 110 and/or some other software and/or hardware circuitry of Mobile Device 100. Protected Workspace Container 112 encapsulates Enterprise Applications 114 together with resources that are allocated to Protected Workspace Container 112 and that may be used to execute Enterprise Applications 114. During execution, Enterprise Applications 114 can only see and use the resources that are allocated to Protected Workspace Container 112. For example, a subset of the memory and/or persistent data storage resources of Mobile Device 100 (e.g. a unique subset of Memory 108) may be allocated to Protected Workspace Container 112. The memory and/or persistent storage that is allocated to Protected Workspace Container 112 is the only memory and/or persistent data storage that can be used to store Enterprise Applications 114, Workspace Screenshot Folder 136, and/or Workspace Cryptographic Key Store 144, e.g. memory used during execution of Enterprise Applications 114 to store program code and/or the contents of Workspace Screenshot Folder 136 and Workspace Cryptographic Key Store 144, and/or persistent storage used to persistently store Enterprise Applications 114 and/or the contents of Workspace Screenshot Folder 136 and Workspace Cryptographic Key Store 144.

Personal Applications 124 execute outside of Protected Workspace Container 112. In some embodiments, Personal Applications 124 may execute within a Personal Container 122. Personal Container 122 is a software container that may also be provided by Operating System 110 and/or some other software and/or hardware circuitry of Mobile Device 100. Personal Container 122 encapsulates Personal Applications 124 together with the resources that are allocated to Personal Container 122. Resources allocated to Personal Container 122 may include a subset of the memory and/or persistent data storage resources of Mobile Device 100 (e.g. a unique subset of Memory 108) that is the only memory and/or persistent data storage that can be used to store Personal Applications 124 and/or Screenshot Folder 150, e.g. memory used during execution of Personal Applications 124 to store program code and/or the contents of Screenshot Folder 150, and/or persistent storage used to persistently store Personal Applications 124 and/or the contents of Screenshot Folder 150.

In some embodiments, the entire contents of Protected Workspace Container 112, e.g. all program code and data stored in the subset of Memory 108 that is allocated to Protected Workspace Container 112, may be independently encrypted. For example, the contents of Protected Workspace Container 112 may be encrypted using an encryption key or keys with a corresponding decryption key or keys that are unavailable to Personal Applications 124. Any such encryption key or keys that are used to encrypt the contents of Protected Workspace Container 112 are accordingly different from any encryption key or keys that are used to perform any encryption that may be performed on the contents of Personal Container 122. The decryption key or keys needed to decrypt the contents of Protected Workspace Container 112 may be privately stored in Protected Workspace Container 112, e.g. in Workspace Cryptographic Key Store 144, which cannot be accessed from outside of Protected Workspace Container 112. In this way, the contents of the Protected Workspace Container 112 may be protected from being accessed by the Personal Applications 124.

In some embodiments, the contents of Protected Workspace Container 112 is viewable and managed by the enterprise, e.g. by a system administrator, at least in part through management policies stored to Mobile Application Management Policies 132 from a remote enterprise server. In contrast, Personal Applications 124 and data that is located outside of Protected Workspace Container 112 (e.g. the contents of Screenshot Folder 150) cannot be accessed by the enterprise, is not managed by the enterprise, and is not be subject to the policies stored in Mobile Application Management Policies 132.

In some embodiments, the Operating System 110 may, for example, be embodied as a modified version of the Android™ operating system developed by Google LLC.

When the user of Mobile Device 100 simultaneously presses a combination of the buttons in Device Buttons 109 that triggers Screenshot Capture Request 146, Screenshot Capture Request 146 is received by Operating System 110. In response to receiving Screenshot Capture Request 146, Operating System 110 processes Screenshot Capture Request 146 by first determining whether the Graphical User Interface 134 being displayed on Display Device 102 at the time that Screenshot Capture Request 146 is received is being generated at least in part by one or more of the Enterprise Applications 114 executing in Protected Workspace Container 112. To determine whether Graphical User Interface 134 is being generated at least in part by one or more of the Enterprise Applications 114 at the time that Screenshot Capture Request 146 is received, Operating System 110 determines whether Graphical User Interface 134 includes at least one user interface of any one of the Enterprise Applications 114 at the time that Screenshot Capture Request 146 is received.

In response to determining that the Graphical User Interface 134 being displayed on the Display Device 102 at the time the Screenshot Capture Request 146 is received is being generated at least in part by one of the Enterprise Applications 114 executing within Protected Workspace Container 112, a secure screenshot save operation is performed, e.g. by Operating System 110. For example, in response to determining that at the time Screenshot Capture Request 146 is received Graphical User Interface 134 includes an Application User Interface 132 that is the user interface generated by Enterprise Application 116, Operating System 110 performs a secure screenshot save operation. The secure screenshot save operation includes storing a screenshot image of the Graphical User Interface 134 at the time the Screenshot Capture Request 146 is received, and preventing that screenshot image from being accessed by any of the Personal Applications 124 that execute outside of the Protected Workspace Container 112.

In some embodiments, the Operating System 110 may prevent the stored screenshot image from being accessed by any of the Personal Applications 124 executing outside of the Protected Workspace Container 112 at least in part by selecting, prior to storing the screenshot image, a location in Protected Workspace Container 112 into which the screenshot is to be stored. For example, a location within the subset of Memory 108 that is allocated to Protected Workspace Container 112 may be selected into which the screenshot image is to be stored. For example, Operating System 110 may select a location into which the screenshot image is to be stored that is within the Workspace Screenshot Folder 136. The screenshot image of Graphical User Interface 134 at the time the Screenshot Capture Request 146 may then be stored as one of the screenshot images in the Workspace Screenshot Folder 136, e.g. as one of Screenshot 1 138, Screenshot 2 140, through Screenshot N 142 that are stored in Workspace Screenshot Folder 136, and that cannot be accessed by any of Personal Applications 124.

In some embodiments, Operating System 110 may prevent a stored screenshot image from being accessed by of the Personal Applications 124 executing outside of the Protected Workspace Container 112 at least in part by encrypting the screenshot image using an encryption key having a corresponding decryption key that is only accessible to one or more of the Enterprise Applications 114 executing within the Protected Workspace Container 112. For example, prior to storing the Screenshot 1 138 into Workspace Screenshot Folder 136, Operating System 110 may encrypt Screenshot 1 138 using an encryption key that has a corresponding decryption key that is stored only within the Workspace Cryptographic Key Store 144. The contents of Workspace Cryptographic Key Store 136 are only accessible within Protected Workspace Container 112, and accordingly only Enterprise Applications 114 can decrypt Screenshot 1 138. The resulting encrypted Screenshot 1 138 may then be safely stored, e.g. within the Workspace Screenshot Folder 136.

In some embodiments, the Operating System 110 may allow the decryption key corresponding to the encryption key that was used to encrypt a screenshot image to be accessed only by the enterprise application within Enterprise Applications 114 that generated at least part of the Graphical User Interface 134 at the time Screenshot Capture Request 146 is received. For example, in the case where Graphical User Interface 134 included or consisted of the Application User Interface 132 of Enterprise Application 1 116 at the time Screenshot Capture Request 146 was received, and where no other ones of the Enterprise Applications 114 generated any part of the Graphical User Interface 134 at the time Screenshot Capture 146 was received, Operating System 110 may allow the decryption key corresponding to the encryption key that was used to encrypt the resulting screenshot image (e.g. Screenshot 1 138) to be accessed only by Enterprise Application 1 116. As a result, only Enterprise Application 1 116 can decrypt that screenshot image (e.g. Screenshot 1 138).

In some embodiments, the disclosed technology may allow the decryption key corresponding to the encryption key used to encrypt a screenshot image to be accessed by all of the enterprise applications within Enterprise Applications 114. For example, Operating System 110 may allow the decryption keys corresponding to the encryption keys that were used to encrypt Screenshot 1 138, Screenshot 2 140, through Screenshot N 142 to be accessed by any one of the Enterprise Applications 114, with the result being that any one of Enterprise Applications 114 can decrypt any one of Screenshot 1 138, Screenshot 2 140, through Screenshot N 142.

In some embodiments, the Enterprise Applications 114 may be segregated into multiple security groups. In such embodiments, the Operating System 110 may allow the decryption key corresponding to an encryption key that was used to encrypt a given screenshot image to be accessed by only one of the security groups. For example, in the case where a first security group includes Enterprise Application 1 116 and Enterprise Application 2 118, and a second security group includes all of the remaining enterprise applications in Enterprise Applications 114, Operating System 110 may allow the decryption key corresponding to an encryption key used to encrypt Screenshot 1 138 to be accessed only by the enterprise applications within the first security group, with the result being that only Enterprise Application 1 116 and Enterprise Application 2 118 can decrypt Screenshot 1 138.

In some embodiments, the security group of enterprise applications within Enterprise Applications 114 that is allowed to access the decryption key corresponding to the encryption key used to encrypt a given screenshot image may be the security group that includes the enterprise application within Enterprise Applications 114 that generated at least part of the Graphical User Interface 134 at the time Screenshot Capture Request 146 was received. For example, in the case where Graphical User Interface 134 included or consisted of the Application User Interface 132 of Enterprise Application 1 116 at the time Screenshot Capture Request 146 was received, and where no other ones of the Enterprise Applications 114 generated any part of the Graphical User Interface 134 at the time Screenshot Capture 146 was received, Operating System 110 may allow the decryption key corresponding to the encryption key that was used to encrypt the resulting screenshot image (e.g. Screenshot 1 138) to be accessed only by the aforementioned first security group, which includes both Enterprise Application 1 116 and Enterprise Application 2 118, with the result being that only the enterprise applications in the first security group (i.e. Enterprise Application 1 116 and Enterprise Application 2 118) can decrypt that screenshot image (e.g. Screenshot 1 138).

Figure 2:
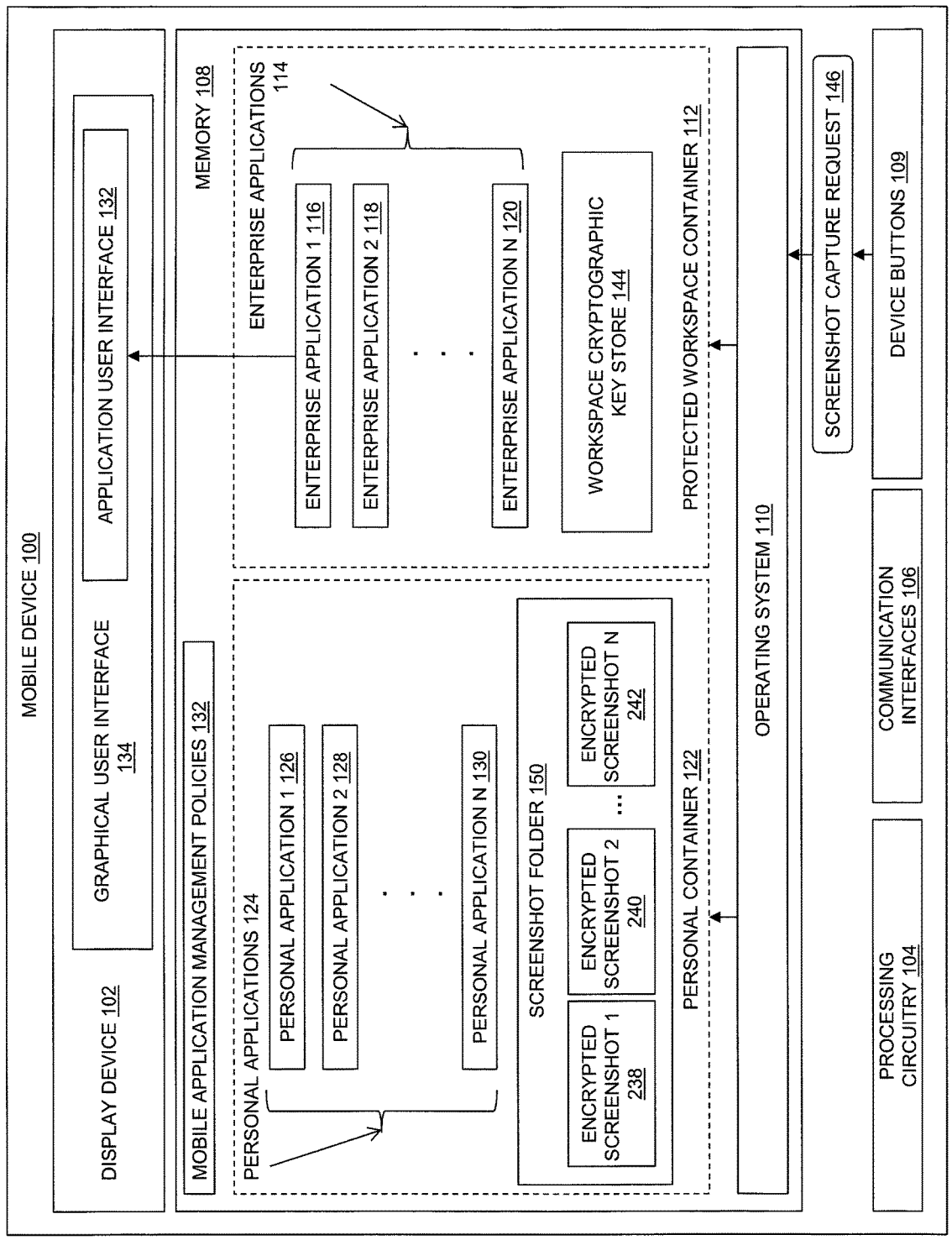
FIG. 2 is a block diagram showing a second example of components in some embodiments of the disclosed technology.

FIG. 2 is a block diagram showing a second example of components in some embodiments of the disclosed technology. In some embodiments illustrated by the components shown in FIG. 2, a secure screenshot save operation may be performed at least in part by storing the encrypted screenshot image into a location in Memory 108 that is outside of the Protected Workspace Container 112. For example, such a location outside of the Protected Workspace Container 112 may be a location that is not within the subset of Memory 108 that is allocated to Protected Workspace Container 112. In some embodiments, prior to storing a screenshot image into Screenshot Folder 150, Operating System 110 may first encrypt the screenshot image using an encryption key that has a corresponding decryption key that is stored only within Workspace Cryptographic Key Store 144, which is only accessible to one or more of the Enterprise Applications 114. The encrypted screenshot image may then be stored outside of Protected Workspace Container 112 in the Screenshot Folder 150, e.g. as one of Encrypted Screenshot 1 238, Encrypted Screenshot 2 240, through Encrypted Screenshot N 242. In this way the disclosed technology may use encryption to prevent the stored screenshot from being accessed by any of the Personal Applications 124 even while the screenshot image is stored outside of the Protected Workspace Container 112.

In some embodiments, the Operating System 110 may allow the decryption key corresponding to the encryption key that was used to encrypt a screenshot image to be accessed only by the enterprise application within Enterprise Applications 114 that generated at least part of the Graphical User Interface 134 at the time Screenshot Capture Request 146 is received. For example, in the case where Graphical User Interface 134 includes or consists of the Application User Interface 132 of Enterprise Application 1 116 at the time Screenshot Capture Request 146 is received, and where no other ones of the Enterprise Applications 114 generate any part of the Graphical User Interface 134 at the time Screenshot Capture 146 is received, Operating System 110 may allow the decryption key corresponding to the encryption key used to encrypt the resulting screenshot image (e.g. Encrypted Screenshot 1 238) to be accessed only by Enterprise Application 1 116, with the result being that only Enterprise Application 1 116 can decrypt that screenshot image (e.g. Encrypted Screenshot 1 238).

In some embodiments, the Operating System 110 may allow the decryption key corresponding to the encryption key used to encrypt a screenshot image to be accessed by all of the enterprise applications within Enterprise Applications 114. For example, Operating System 110 may allow the decryption keys corresponding to the encryption keys that were used to encrypt any of Encrypted Screenshot 1 238, Encrypted Screenshot 2 240, through Encrypted Screenshot N 242 to be accessed by any one of the Enterprise Applications 114, with the result being that any one of Enterprise Applications 114 can decrypt any one of Encrypted Screenshot 1 238, Encrypted Screenshot 2 240, through Encrypted Screenshot N 242.

In some embodiments, the Enterprise Applications 114 may be segregated into multiple security groups. In such embodiments, the Operating System 110 may allow the decryption key corresponding to an encryption key that was used to encrypt a given screenshot image to be accessed by only one of the security groups. For example, in the case where a first security group includes Enterprise Application 1 116 and Enterprise Application 2 118, and a second security group includes all the remaining enterprise applications in Enterprise Applications 114, Operating System 110 may allow the decryption key corresponding to an encryption key used to encrypt Encrypted Screenshot 1 238 to be accessed only by the enterprise applications within the first security group, with the result being that only Enterprise Application 1 116 and Enterprise Application 2 118 can decrypt Encrypted Screenshot 1 238.

In some embodiments, the security group of enterprise applications within Enterprise Applications 114 that is allowed to access the decryption key corresponding to the encryption key used to encrypt a given screenshot image may be the security group that includes the enterprise application within Enterprise Applications 114 that generated at least part of the Graphical User Interface 134 at the time Screenshot Capture Request 146 was received. For example, in the case where Graphical User Interface 134 includes or consists of the Application User Interface 132 of Enterprise Application 1 116 at the time Screenshot Capture Request 146 is received, and where no other ones of the Enterprise Applications 114 generate any part of the Graphical User Interface 134 at the time Screenshot Capture 146 is received, Operating System 110 may allow the decryption key corresponding to the encryption key that was used to encrypt the resulting screenshot image (e.g. Encrypted Screenshot 1 238) to be accessed only by the aforementioned first security group, which includes both Enterprise Application 1 116 and Enterprise Application 2 118. As a result, only the enterprise applications in the first security group (i.e. Enterprise Application 1 116 and Enterprise Application 2 118) can decrypt that screenshot image (e.g. Encrypted Screenshot 1 238).

In some embodiments, Screenshot Folder 150 may additionally or alternatively be used to store one or more unencrypted screenshot images that are captured at times when the Screenshot Capture Request 146 is received and the Graphical User Interface 134 includes only one or more user interfaces of Personal Applications 124.

Figure 3:
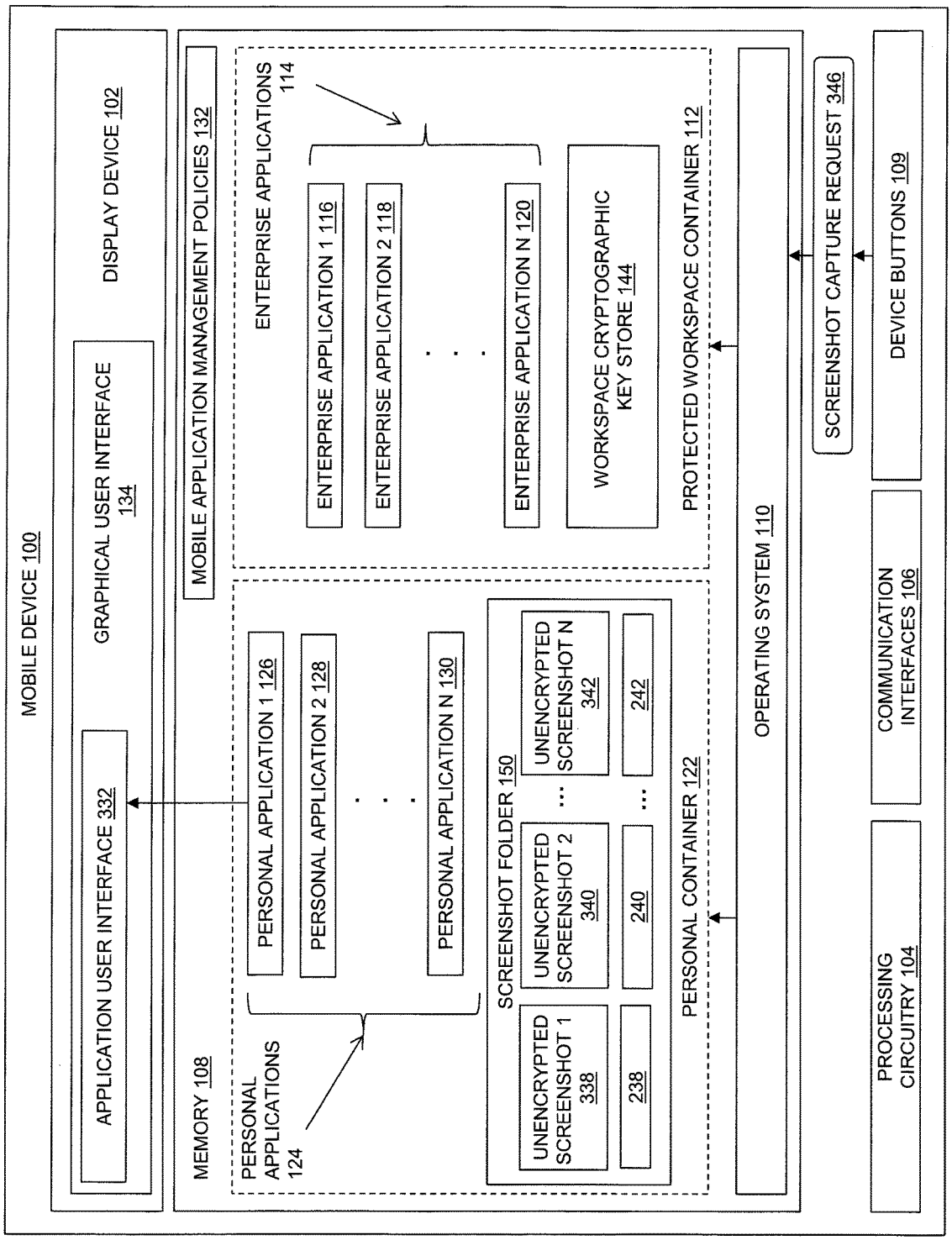
FIG. 3 is a block diagram showing a third example of components in some embodiments of the disclosed technology.

FIG. 3 is a block diagram showing a third example of components in some embodiments of the disclosed technology. In some embodiments illustrated by the components shown in FIG. 3, the Operating System 110 may determine that the Graphical User Interface 134 being displayed on the Display Device 102 of the Mobile Device 100 at the time a Screenshot Capture Request 346 is received is not generated in part by any one of the Enterprise Applications 114, and is instead generated by one or more personal applications executing outside the protected workspace container in the mobile device, e.g. includes or consists of an Application User Interface 332 that is generated by Personal Application 1 126. In response to determining that the Graphical User Interface 134 being displaced on Display Device 102 at the time Screenshot Capture Request 346 is received is not generated by any of the Enterprise Applications 114, and instead consists of or includes Application User Interface 332 generated by Personal Application 1 126, Operating System 110 performs a personal screenshot save operation. The personal screenshot operation may include storing an unencrypted screenshot image of the Graphical User Interface 134 that is displayed at the time Screenshot Capture Request 346 is received, e.g. as one of the unencrypted screenshots stored in Screenshot Folder 150. Because Screenshot Folder 150 is outside of Protected Workspace Container 112, the screenshot images stored in Screenshot Folder 150 that are not encrypted such that they must be decrypted using decryption keys stored in the Protected Workspace Container 112 (e.g. in Workspace Cryptographic Key Store 144), such as Unencrypted Screenshot 1 338, Unencrypted Screenshot 2 340, and so on through Unencrypted Screenshot N 342, can be accessed by Personal Applications 124. In this way, Personal Applications 124 are permitted to access any of the unencrypted screenshot images stored in Screenshots Folder 150.

Figure 4:
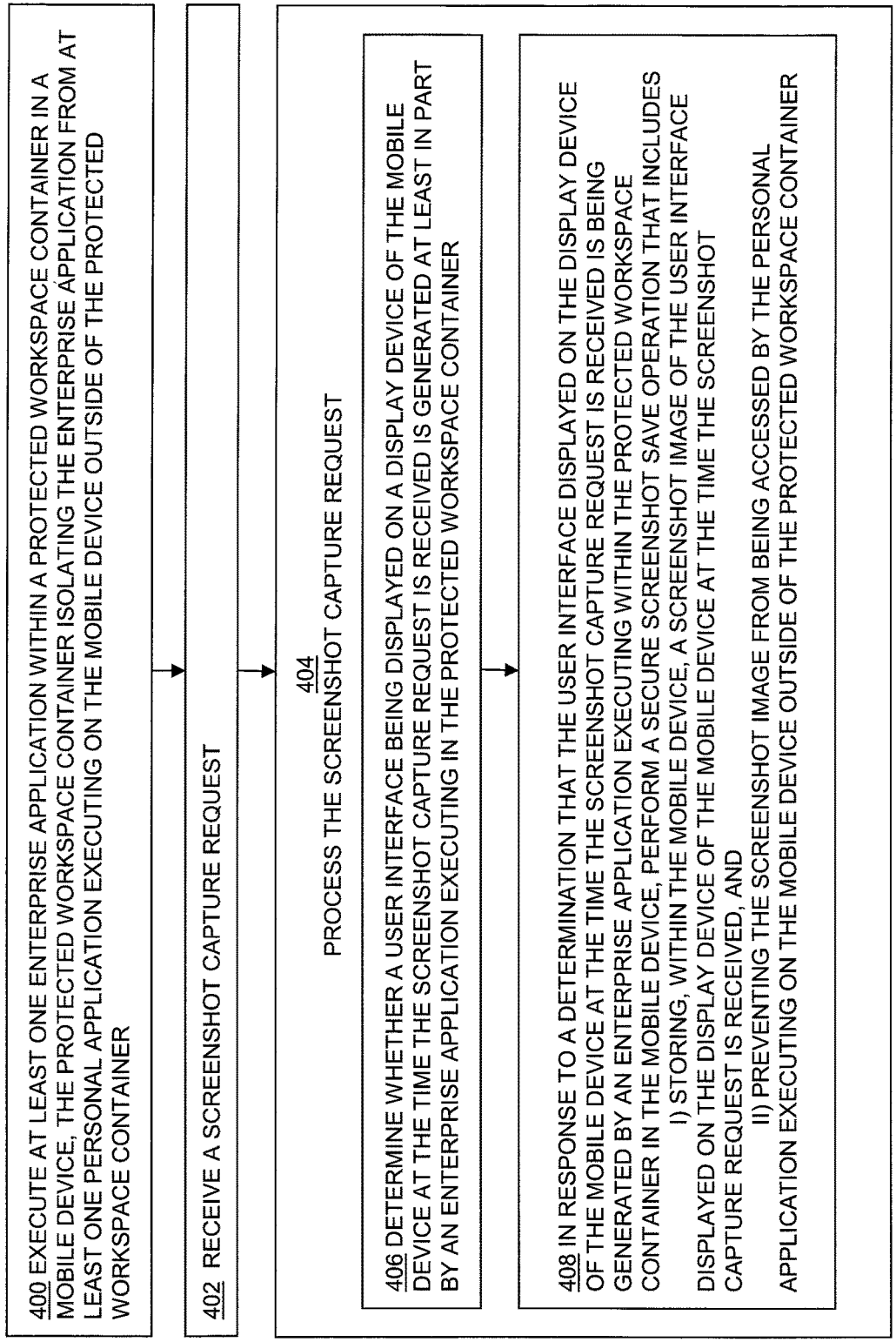
FIG. 4 is a first flow chart illustrating steps performed during operation of some embodiments of the disclosed technology.

FIG. 4 is a first flow chart illustrating steps performed during operation of some embodiments of the disclosed technology. The steps of FIG. 4 may be performed by an operating system and/or other program code executing in a mobile device, and/or hardware circuitry of the mobile device. As shown in FIG. 4, at step 400, at least one enterprise application is executed within a protected workspace container in the mobile device. The protected workspace container isolates the enterprise application from at least one personal application that is simultaneously executing on the mobile device outside of the protected workspace container.

At step 402, a screenshot capture request is received, e.g. in response to the user simultaneously pressing a combination of buttons on the mobile device.

At step 404, the received screenshot capture request is processed. The processing of the screenshot capture request includes, at step 406, determining whether a graphical user interface being displayed on a display device of the mobile device at the time the screenshot capture request is received is generated at least in part by one of the enterprise applications executing in the protected workspace container. The processing of the screenshot capture request further includes, at step 408, in response to determining that the graphical user interface displayed on the display device of the mobile device at the time the screenshot capture request is received is being generated at least in part by an enterprise application executing within the protected workspace container in the mobile device, performing a secure screenshot save operation that includes i) storing, within the mobile device, a screenshot image of the user interface displayed on the display device of the mobile device at the time the screenshot capture request is received, and ii) preventing the screenshot image from being accessed by the personal application executing on the mobile device outside of the protected workspace container.

Figure 5:
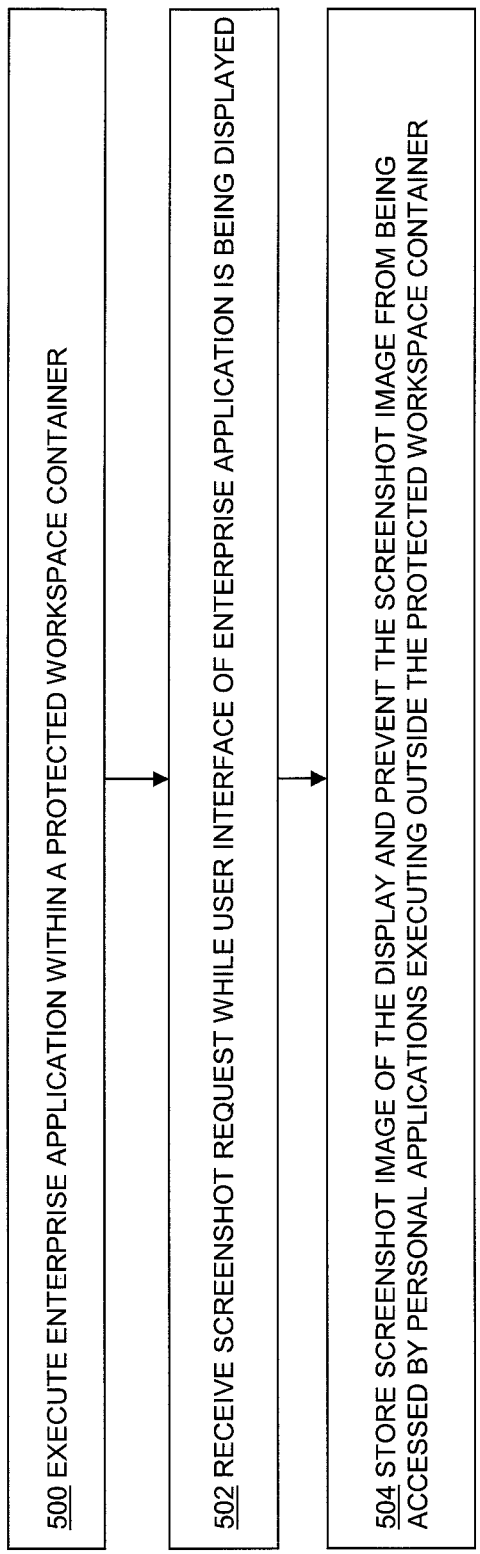
FIG. 5 is a second flow chart illustrating steps performed during operation of some embodiments of the disclosed technology.

FIG. 5 is a second flow chart illustrating steps performed during operation of some embodiments of the disclosed technology. The steps of FIG. 5 may be performed by an operating system and/or other program code executing in a mobile device, and/or hardware circuitry of the mobile device.

At step 500 an enterprise application is executed in a protected workspace container.

At step 502 a screenshot request is received while the user interface of the enterprise application is being displayed.

At step 504, a screenshot image of the display is stored, and access to the stored screenshot image by personal applications executing outside of the protected workspace container is prevented.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, functions of the embodiments illustrated herein may take the form of a computer program product embodied at least in part in one or more non-transitory computer readable storage medium(s) having computer readable program code stored thereon for causing one or more processors to carry out those functions.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that one or more of the block in such figures, and combinations of the blocks, can be implemented by computer program instructions. These computer program instructions may be executed on processing circuitry to form specialized hardware. The computer program instructions may further be loaded onto a mobile computing device to produce a machine, such that the instructions which execute on the mobile computing device create means for implementing the functions specified in the block or blocks. The computer program instructions may also be stored in a computer-readable memory that can direct a mobile computing device to function in a particular manner, such that the instructions stored in the computer-readable memory produce an article of manufacture including instruction means which implement the function specified in the block or blocks. The computer program instructions may also be loaded onto a mobile computing device to cause a series of operational steps to be performed to produce a computer implemented process such that the instructions which execute on the mobile computing device provide steps for implementing the functions specified in the block or blocks.

It will also be understood by those of ordinary skill in the art that modification to and variation of the illustrated embodiments may be made without departing from the inventive concepts described herein.

What is claimed is:

1. A method of protecting screenshots captured on a mobile device, comprising:
   executing at least one enterprise application within a protected workspace container in the mobile device, wherein the protected workspace container isolates the enterprise application from at least one personal application executing on the mobile device outside of the protected workspace container;
   receiving a screenshot capture request;
   in response to receiving the screenshot capture request, processing the screenshot capture request by:
   determining whether a graphical user interface being displayed on a display device of the mobile device at the time the screenshot capture request is received is generated at least in part by an enterprise application executing in the protected workspace container,
   in response to determining that the graphical user interface displayed on the display device of the mobile device at the time the screenshot capture request is received is being generated at least in part by an enterprise application executing within the protected workspace container in the mobile device, performing a secure screenshot save operation that includes:
i) storing, within the mobile device, a screenshot image of the graphical user interface displayed on the display device of the mobile device at the time the screenshot capture request is received, and ii) preventing the screenshot image from being accessed by the personal application executing on the mobile device outside of the protected workspace container, wherein preventing the stored screenshot image form being accessed by the personal application executing on the mobile device outside of the protected workspace container includes encrypting the screenshot image using an encryption key having a corresponding decryption key that is only accessible within the protected workspace container and allowing the decryption key corresponding to the encryption key used to encrypt the screenshot image to be accessed only by the enterprise application executing within the protected workspace container in the mobile device that generated at least part of the graphical user interface being displayed on a display device of the mobile device at the time the screenshot capture request is received.

2. The method of claim 1, further comprising:
wherein preventing the stored screenshot image from being accessed by the personal application executing on the mobile device outside of the protected workspace container includes selecting, prior to storing the screenshot image, a location in the data storage resources of the mobile device in which the screenshot image is to be stored that is within the protected workspace container; and
wherein storing the screenshot image of the user interface displayed on the display device of the mobile device at the time the screenshot capture request is received comprises storing the screenshot image to the selected location in the data storage resources of the mobile device that is within the protected workspace container.

3. The method of claim 1, wherein the secure screenshot save operation stores the encrypted screenshot image in a location in the data storage resources of the mobile device that is outside the protected workspace container.

4. The method of claim 1, wherein the at least one enterprise application executing within the protected workspace container in the mobile device comprises a plurality of enterprise applications, and further comprising:
allowing the decryption key corresponding to the encryption key used to encrypt the screenshot image to be accessed by all of the plurality of enterprise applications executing in the protected workspace container in the mobile device.

5. The method of claim 1, wherein the at least one enterprise application executing within the protected workspace container in the mobile device comprises a plurality of enterprise applications, and further comprising:
allowing the decryption key corresponding to the encryption key used to encrypt the screenshot image to be accessed by a security group of enterprise applications executing in the protected workspace container in the mobile device, wherein the security group of enterprise applications executing in the protected workspace container in the mobile device comprises less than all of the enterprise applications executing in the protected workspace container in the mobile device.

6. The method of claim 5, wherein the security group of enterprise applications executing in the protected workspace container in the mobile device includes the enterprise application executing within the protected workspace container in the mobile device that generated at least part of the graphical user interface being displayed on the display device of the mobile device at the time the screenshot capture request was received.

7. The method of claim 1, further comprising: receiving a second screenshot capture request;
in response to receiving the second screenshot capture request, processing the screenshot capture request by:
determining whether a graphical user interface being displayed on a display device of the mobile device at the time the second screenshot capture request is received is generated at least in part by a personal application executing outside the protected workspace container, and
in response to determining that the user interface displayed on the display device of the mobile device at the time the second screenshot capture request is received is being generated by a personal application executing outside the protected workspace container in the mobile device, performing a personal screenshot save operation that includes i) storing, within the mobile device, a second screenshot image of the graphical user interface displayed on the display device of the mobile device at the time the second screenshot capture request is received, and ii) allowing the second screenshot image from to be accessed by at least one personal application executing on the mobile device outside of the protected workspace container.

8. The method of claim 1, wherein receiving the screenshot capture request comprises receiving a plurality of buttons being pressed simultaneously on the mobile device.

9. The method of claim 1, wherein the screenshot capture request is received and processed by an operating system of the mobile device.

10. A mobile device, comprising:
processing circuitry;
a memory storing program code, wherein the program code stored in the memory is executable on the processing circuitry, and wherein the program code, when executed on the processing circuitry, causes the processing circuitry to:
execute at least one enterprise application within a protected workspace container in the mobile device, wherein the protected workspace container isolates the enterprise application from at least one personal application executing on the mobile device outside of the protected workspace container;
receive a screenshot capture request;
in response to receiving the screenshot capture request, process the screenshot capture request at least in part by causing the processing circuitry to:
determine whether a graphical user interface being displayed on a display device of the mobile device at the time the screenshot capture request is received is generated at least in part by an enterprise application executing in the protected workspace container, and in response to a determination that the graphical user interface displayed on the display device of the mobile device at the time the screenshot capture request is received is being generated at least in part by an enterprise application executing within the protected workspace container in the mobile device, perform a secure screenshot save operation at least in part by causing the processing circuitry to i) store, within the mobile device, a screenshot image of the graphical user interface displayed on the display device of the mobile device at the time the screenshot capture request is received, and ii) prevent the screenshot image from being accessed by the personal application executing on the mobile device outside of the protected workspace container, wherein the stored screenshot image is prevented from being accessed by the personal application executing on the mobile device outside of the protected workspace container at least in part by the processing circuitry encrypting the screenshot image using an encryption key having a corresponding decryption key that is only accessible within the protected workspace container and allowing the decryption key corresponding to the encryption key used to encrypt the screenshot image to be accessed only by the enterprise application executing within the protected workspace container in the mobile device that generated at least part of the graphical user interface being displayed on a display device of the mobile device at the time the screenshot capture request is received.

11. The mobile device of claim 10, further comprising:
wherein the program code further causes the processing circuitry to prevent the stored screenshot image from being accessed by the personal application executing on the mobile device outside of the protected workspace container at least in part by causing the processing circuitry to select, prior to storing the screenshot image, a location in the data storage resources of the mobile device in which the screenshot image is to be stored that is within the protected workspace container; and
wherein the screenshot image of the user interface displayed on the display device of the mobile device at the time the screenshot capture request is received is stored to the selected location in the data storage resources of the mobile device that is within the protected workspace container.

12. The mobile device of claim 10, wherein the program code further causes the processing circuitry to perform the secure screenshot save operation at least in part by causing the processing circuitry to store the encrypted screenshot image in a location in the data storage resources of the mobile device that is outside the protected workspace container.

13. The mobile device of claim 10, wherein the at least one enterprise application executing within the protected workspace container in the mobile device comprises a plurality of enterprise applications, and wherein the program code further causes the processing circuitry to:
allow the decryption key corresponding to the encryption key used to encrypt the screenshot image to be accessed by all of the plurality of enterprise applications executing in the protected workspace container in the mobile device.

14. The mobile device of claim 10, wherein the at least one enterprise application executing within the protected workspace container in the mobile device comprises a plurality of enterprise applications, and wherein the program code further causes the processing circuitry to:
allow the decryption key corresponding to the encryption key used to encrypt the screenshot image to be accessed by a security group of enterprise applications executing in the protected workspace container in the mobile device, wherein the security group of enterprise applications executing in the protected workspace container in the mobile device comprises less than all of the enterprise applications executing in the protected workspace container in the mobile device.

15. The mobile device of claim 14, wherein the security group of enterprise applications executing in the protected workspace container in the mobile device includes the enterprise application executing within the protected workspace container in the mobile device that generated at least part of the graphical user interface being displayed on the display device of the mobile device at the time the screenshot capture request was received.

16. The mobile device of claim 10, wherein the program code further causes the processing circuitry to:
receive a second screenshot capture request;
in response to receiving the second screenshot capture request, process the screenshot capture request by causing the processing circuitry to:
determine whether a graphical user interface being displayed on a display device of the mobile device at the time the second screenshot capture request is received is generated at least in part by a personal application executing outside the protected workspace container, and
in response to a determination that the graphical user interface displayed on the display device of the mobile device at the time the second screenshot capture request is received is not being generated by any enterprise application executing within the protected workspace container in the mobile device, performing a personal screenshot save operation at least in part by causing the processing circuitry to i) store, within the mobile device, a second screenshot image of the graphical user interface displayed on the display device of the mobile device at the time the second screenshot capture request is received, and ii) allow the second screenshot image from to be accessed by at least one personal application executing on the mobile device outside of the protected workspace container.

17. The mobile device of claim 10, wherein the program code further causes the processing circuitry to receive the screenshot capture request at least in part by receiving that a plurality of buttons being has been pressed simultaneously on the mobile device.

18. The mobile device of claim 10, wherein the program code includes an operating system of the mobile device; and
wherein the operating system receives and processes the screenshot capture request.

19. A non-transitory computer readable medium storing program code for protecting screenshots captured on a mobile device, wherein the program code, when executed by processing circuitry of a mobile device, causes the processing circuitry to perform a method of:
executing at least one enterprise application within a protected workspace container in the mobile device, wherein the protected workspace container isolates the enterprise application from at least one personal application executing on the mobile device outside of the protected workspace container;
receiving a screenshot capture request;
in response to receiving the screenshot capture request, processing the screenshot capture request by:
determining whether a graphical user interface being displayed on a display device of the mobile device at the time the screenshot capture request is received is generated at least in part by an enterprise application executing in the protected workspace container, and in response to determining that the graphical user interface displayed on the display device of the mobile device at the time the screenshot capture request is received is being generated at least in part by an enterprise application executing within the protected workspace container in the mobile device, performing a secure screenshot save operation that includes i) storing, within the mobile device, a screenshot image of the graphical user interface displayed on the display device of the mobile device at the time the screenshot capture request is received, and ii) preventing the screenshot image from being accessed by the personal application executing on the mobile device outside of the protected workspace container, wherein preventing the stored screenshot image from being accessed by the personal application executing on the mobile device outside of the protected workspace container includes encrypting the screenshot image using an encryption key having a corresponding decryption key that is only accessible within the protected workspace container and allowing the decryption key corresponding to the encryption key used to encrypt the screenshot image to be accessed only by the enterprise application executing within the protected workspace container in the mobile device that generated at least part of the graphical user interface being displayed on a display device of the mobile device at the time the screenshot capture request is received.

* * * * *